United States Patent
Tehrani et al.

(10) Patent No.: US 12,281,233 B2
(45) Date of Patent: Apr. 22, 2025

(54) INKJET PRIMER COMPOSITIONS

(71) Applicant: Xerox Corporation, Norwalk, CT (US)

(72) Inventors: Sepehr M. Tehrani, North York (CA); Biby Esther Abraham, Mississauga (CA); Syed Mohsin Ali, Milton (CA); Mihaela Maria Birau, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 161 days.

(21) Appl. No.: 18/151,587

(22) Filed: Jan. 9, 2023

(65) Prior Publication Data

US 2024/0240043 A1 Jul. 18, 2024

(51) Int. Cl.
*C09D 11/54* (2014.01)
*C09D 11/324* (2014.01)

(52) U.S. Cl.
CPC ............ *C09D 11/54* (2013.01); *C09D 11/324* (2013.01)

(58) Field of Classification Search
CPC ....... C09D 11/322; C09D 11/54; C09D 11/40; C09D 11/106; C09D 11/324; C09D 11/101; C09D 11/30; C09D 11/326; C09D 11/00; C09D 11/033; C09D 11/037; C09J 125/14; C08F 212/08
See application file for complete search history.

(56) References Cited

U.S. PATENT DOCUMENTS

| | | | |
|---|---|---|---|
| 4,923,919 A | 5/1990 | Frazee | |
| 5,461,103 A | 10/1995 | Bafford et al. | |
| 6,433,091 B1 | 8/2002 | Cheng | |
| 8,328,927 B2 | 12/2012 | Aoyama et al. | |
| 8,728,455 B2 | 5/2014 | Konradi et al. | |
| 9,090,736 B2 | 7/2015 | Schwalm et al. | |
| 9,234,110 B2 | 1/2016 | Katoh et al. | |
| 9,359,522 B2 | 6/2016 | Matsuyama et al. | |
| 9,371,464 B2 | 6/2016 | Breton et al. | |
| 9,862,788 B2 | 1/2018 | Hilf et al. | |
| 9,963,592 B2 | 5/2018 | Burns et al. | |
| 10,968,358 B2 | 4/2021 | Kunii et al. | |
| 11,179,957 B2 | 11/2021 | Washio et al. | |
| 2006/0038867 A1 | 2/2006 | Valentini | |
| 2008/0186373 A1 | 8/2008 | Rolly | |
| 2010/0075044 A1 | 3/2010 | Kato et al. | |
| 2011/0012955 A1 | 1/2011 | Tom et al. | |
| 2011/0318551 A1 | 12/2011 | Nakagawa | |
| 2016/0122597 A1 | 5/2016 | Xiao et al. | |
| 2018/0056691 A1* | 3/2018 | Arai | C09D 11/101 |
| 2018/0086935 A1 | 3/2018 | Niu et al. | |
| 2018/0371260 A1 | 12/2018 | Wu | |
| 2019/0367753 A1 | 12/2019 | Chopra et al. | |
| 2020/0392360 A1 | 12/2020 | Sato et al. | |
| 2021/0222025 A1 | 7/2021 | Okazaki et al. | |
| 2022/0033674 A1 | 2/2022 | Boscan Guerra | |
| 2023/0073050 A1 | 3/2023 | Duquenne et al. | |
| 2023/0183403 A1 | 6/2023 | Tehrani | |
| 2023/0183503 A1 | 6/2023 | Tehrani et al. | |
| 2024/0228805 A1 | 7/2024 | Tehrani et al. | |

FOREIGN PATENT DOCUMENTS

| | | |
|---|---|---|
| EP | 1609827 A1 | 12/2005 |
| EP | 1108758 B1 | 7/2006 |
| EP | 2614964 B1 | 7/2013 |
| EP | 2823002 B1 | 5/2016 |
| EP | 2285920 | 9/2016 |
| EP | 1756237 B1 | 5/2017 |
| EP | 3263662 A1 | 1/2018 |
| EP | 3290486 A1 | 3/2018 |
| EP | 3000853 B1 | 4/2020 |
| EP | 3494182 B1 | 4/2020 |
| JP | 2019/111687 A | 7/2019 |
| JP | 2020/059153 A | 4/2020 |
| KR | 20160077982 A | 7/2016 |
| WO | WO2014/042653 | 3/2014 |
| WO | WO2015/091318 | 6/2015 |
| WO | WO2018/087287 A1 | 5/2018 |
| WO | WO2018/143957 | 8/2018 |
| WO | WO2018/143959 | 8/2018 |
| WO | WO2018/143962 | 8/2018 |
| WO | WO2018/158436 A1 | 9/2018 |
| WO | WO2021/126611 A1 | 6/2021 |
| WO | WO2021/136721 | 7/2021 |

OTHER PUBLICATIONS

Extended EP Search Report for EP Application No. 23217061.3 prepared by European Patent Office dated Apr. 24, 2024.
Evonik launches VISIOMERA® GLYFOMA, a low-odor reactive diluent—Evonik PDF press release, available from web as of Jul. 13, 2021 at https://methyl-methacrylate-monomers.evonik.com/en/evonik-launches-visiomer-glyfoma-a-low-odor-reactive-diluent-96754.html.
Knepper, Thomas P. "Synthetic chelating agents and compounds exhibiting complexing properties in the aquatic environment." TrAC Trends in Analytical Chemistry 22.10 (2003): 708-724.

* cited by examiner

*Primary Examiner* — Jannelle M Lebron
(74) *Attorney, Agent, or Firm* — Bell & Manning, LLC

(57) ABSTRACT

Inkjet primer compositions are provided, including those comprising water, a co-medium, and resin particles, wherein the resin particles comprise a polymerization product of reactants comprising one or more types of metal chelating monomers. Inkjet sets for inkjet printing systems are also provided including those comprising such an inkjet primer composition; and an aqueous inkjet ink composition for printing on an ink-receiving layer, the ink-receiving layer comprising the resin particles of the inkjet primer composition, the aqueous inkjet ink composition comprising water, a colorant, and additional resin particles.

20 Claims, No Drawings

INKJET PRIMER COMPOSITIONS

BACKGROUND

Inkjet printing on some substrates, e.g., offset coated paper, corrugated paper, and plastic, is challenging. Aqueous inkjet ink compositions printed on such substrates can dry slowly and result in poor image quality and reduced image durability. Some primers have been developed to address these challenges. Existing primers contain positively charged components (e.g., polyvalent metal salts, amine-functional polymers) so as to induce agglomeration of negatively charged ink components; include certain polymeric binders to seal off pores of substrates; and/or include inorganic particles (e.g., silica, titania). In addition, many existing primers are not printable via inkjet printing systems.

SUMMARY

The present disclosure provides inkjet primer compositions which may be used to provide an ink-receiving layer for subsequently printing an aqueous inkjet ink composition thereon. The inkjet primer compositions comprise water, a co-medium and resin particles. The resin particles are polymerized from various monomers, including metal chelating monomers.

By "inkjet" in "inkjet primer composition" it is meant that the composition is printable, i.e., jettable, by an inkjet printing system, including a piezoelectric inkjet printing system configured to eject droplets of the inkjet primer composition onto an underlying substrate by oscillations of piezoelectric vibrating elements. Printability by inkjet printing systems is further described below. Unless otherwise indicated, the term "printing" and the like in the present disclosure refers to printing via an inkjet printing system.

By "primer" in "inkjet primer composition," it is meant that the composition is intended to form an ink-receiving layer. The primer is optionally free of, i.e., does not comprise, a colorant (e.g., dye, pigment). Thus, the inkjet primer compositions and ink-receiving layers formed therefrom are optionally colorless. In embodiments, the inkjet primer compositions and ink-receiving layers formed therefrom are colorless.

As used herein, "room temperature" refers to a temperature of from about 20° C. to about 25° C.

As further described below, ink-receiving layers formed from embodiments of the inkjet primer compositions improve linewidth, mottle, and raggedness of images formed from aqueous inkjet ink compositions printed onto the ink-receiving layers. Surprisingly, embodiments of the inkjet primer compositions (ink-receiving layers formed therefrom) result in greatly reduced gloss differential values (Δ gloss) of subsequently printed aqueous inkjet ink compositions. Specifically, the Examples below demonstrate that the Δ gloss of an aqueous inkjet ink composition printed onto an ink-receiving layer formed from an illustrative inkjet primer composition was over a factor of 12 lower than the aqueous inkjet ink composition printed directly onto a substrate without the ink-receiving layer. This is an unprecedented and significant commercial improvement in gloss performance.

Inkjet primer compositions are provided. In embodiments, an inkjet primer composition comprises water, a co-medium, and resin particles, wherein the resin particles comprise a polymerization product of reactants comprising one or more types of metal chelating monomers.

Inkjet sets for inkjet printing systems are also provided. In embodiments, an inkjet set comprises an inkjet primer composition comprising water, a co-medium, and resin particles, wherein the resin particles comprise a polymerization product of reactants comprising one or more types of metal chelating monomers; and an aqueous inkjet ink composition for printing on an ink-receiving layer, the ink-receiving layer comprising the resin particles of the inkjet primer composition, the aqueous inkjet ink composition comprising water, a colorant, and additional resin particles.

Other principal features and advantages of the disclosure will become apparent to those skilled in the art upon review of the following drawings, the detailed description, and the appended claims.

DETAILED DESCRIPTION

Inkjet Primer Compositions

The inkjet primer compositions comprise water, a co-medium, and resin particles. The resin particles are synthesized from various monomers, forming a polymeric material from which the resin particles are composed. Hydrophobic monomers may be used to form the resin particles. Being hydrophobic, the hydrophobic monomers have limited solubility/miscibility in water, e.g., a room temperature solubility in water of 0.1 g/L to 3 g/L. However, in embodiments, hydrophobic monomers having a room temperature solubility of less than 0.1 g/L are not used. Various hydrophobic monomers may be used such as styrene; alkyl (meth) acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (B-CEA), phenyl acrylate, methyl alphachloroacrylate; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. (Throughout the present disclosure, the use of "(meth)" as in, e.g., "(meth)acrylate", refers to both acrylate and methacrylate.) A single type or combinations of different types of hydrophobic monomers may be used. The phrase "single type" refers to same chemical compounds whereas the phrase "different types" refers to different chemical compounds. For example, styrene is a single type of hydrophobic monomer while styrene and alkyl (meth)acrylates are different types of hydrophobic monomers. Methyl (meth)acrylate is a single type of hydrophobic monomer (specifically, a single type of alkyl (meth)acrylate) while methyl (meth)acrylate and ethyl (meth)acrylate are different types of hydrophobic monomers (specifically, different types of alkyl (meth)acrylates). Thus, the phrase "one or more types" encompasses both monomers of a single type and monomers of different types.

In embodiments, hydrophobic monomers are used to form the resin particles which comprise (or consist of) styrene, an alkyl (meth)acrylate (e.g., methyl (meth)acrylate, ethyl (meth)acrylate, butyl (meth)acrylate, or combinations thereof), or both. Thus, the alkyl group of the alkyl (meth) acrylates may have 1 or more carbons, 2 or more carbons, 4 or more carbons, or from 1 to 6 carbons.

In embodiments, certain hydrophobic monomers are not used to form the resin particles, including 4-methylstyrene, cyclohexyl acrylate, isobornyl methacrylate, isobornyl acrylate, a (meth)acrylamide, or combinations thereof.

Metal chelating monomers are used to form the resin particles. Metal chelating monomers are monomers having a polymerizable moiety (e.g., a carbon-carbon double bond) and a metal ion binding moiety. Without wishing to be bound to any particular theory, it is believed that when incorporated into the polymeric material from which the resin particles are composed, the metal chelating monomers allow the resin particles to form complexes with metal ions due to these metal ion binding moieties. Specifically, the metal ion binding moiety is capable of bonding (e.g., via an ionic bond) to a metal ion, e.g., $Ca^{2+}$. For example, the metal ion binding moiety may deprotonate in water, thereby rendering it negatively charged and capable of forming an ionic bond with a positively charged metal ion. Such metal chelating monomers may be characterized by their $pK_a$ values. In embodiments, the metal chelating monomer is characterized by a $pK_a$ (in water at room temperature) of 3 or less. This includes a $pK_a$ of 2 or less and a $pK_a$ of 1 or less. In embodiments, the metal ion binding moiety is capable of donating more than one hydrogen ion, e.g., two or three. Such metal chelating monomers have more than one $pK_a$ value, but the values referenced above refer to the lowest $pK_a$ value of the metal chelating monomer. Salts of the metal chelating monomers are also encompassed, e.g., in which a donated hydrogen of the metal ion binding moiety is replaced by a cation. Thus, "metal chelating monomer" also refers to a salt thereof.

Examples of metal chelating monomers include phosphoric acid monomers, sulfonic acid monomers, or both phosphoric acid and sulfonic acid monomers. Phosphoric acid monomers are polymerizable monomers that have a polymerizable moiety (e.g., a carbon-carbon double bond) as well as a $P(O)(OR)_3$ moiety (the metal ion binding moiety). The polymerizable moiety may be provided by the R group. The metal chelating monomer may have more than one polymerizable group. In the $P(O)(OR)_3$ moiety, each R may be independently selected from a hydrogen and an organic group, wherein at least one R is the organic group. In embodiments, at least one R is the hydrogen. The term "phosphoric acid" is used since the $P(O)(OR)_3$ moiety is closely related to phosphoric acid, $P(O)(OH)_3$, having three hydroxyl groups. The phosphoric acid monomer used may have 1, 2, or 3 such organic groups, which may be the same or different. Salts of the phosphoric acid monomer are also encompassed, i.e., in which the hydrogen of an OH group is replaced by a cation. Thus, "phosphoric acid monomer" also refers to a salt thereof. The $P(O)(OR)_3$ moiety is distinguished from a phosphonic acid moieties having formula $P(O)(OR)_2R$.

In embodiments, the organic group is an alkyl (meth)acrylate. In embodiments, the alkyl group of the alkyl (meth)acrylate has at least 2 carbons, at least 3 carbons, at least 4 carbons, at least 5 carbons, or from 1 to 6 carbons. In embodiments, at least one R is ethyl (meth)acrylate. In embodiments, the phosphoric acid monomer has 1, 2, or 3 ethyl (meth)acrylate groups. Illustrative phosphoric acid monomers include phosphoric acid 2-hydroxyethyl methacrylate ester and bis[2-(methacryloyloxy)ethyl] phosphate. Both types of phosphoric acid monomers may be used together.

In embodiments, the organic group has Formula I

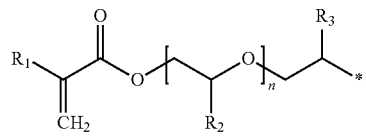

wherein $R_{1-3}$ are independently selected from hydrogen and methyl; n is from 0 to 20, including any number between 0 and 20; and "*" denotes the bond to an oxygen of the $P(O)(OR)_3$ moiety. In embodiments, n is 0, $R_1$ is hydrogen or methyl, and $R_3$ is hydrogen. One, two, or three such organic groups may be present in the phosphoric acid monomer.

In embodiments, the phosphoric acid monomer is based on poly(ethylene glycol) wherein in Formula I, $R_1$ is hydrogen or methyl, $R_2$ is hydrogen, $R_3$ is hydrogen and n is from 0 to 20. In embodiments, n is from 1 to 20. This includes from 2 to 16 and from 4 to 12. One, two, or three such organic groups may be present in the phosphoric acid monomer. In embodiments, one such organic group is present to provide a phosphate ester of poly(ethylene glycol) mono(meth)acrylate (i.e., the other R groups are hydrogen).

In embodiments, the phosphoric acid monomer is based on poly(propylene glycol) wherein in Formula I, $R_1$ is hydrogen or methyl, $R_2$ is methyl, $R_3$ is methyl and n is from 0 to 20. In embodiments, n is from 1 to 20. This includes from 2 to 16 and from 4 to 12. One, two, or three such organic groups may be present in the phosphoric acid monomer. In embodiments, one such organic group is present to provide a phosphate ester of poly(propylene glycol) mono(meth)acrylate (i.e., the other R groups are hydrogen).

Although other organic groups may be used in the phosphoric acid monomer, in embodiments, the organic group is generally not vinyl (i.e., $CH_2CH_2$).

A single type or combinations of different types of phosphoric acid monomers may be used. (The meaning of "single type," "different types," and "one or more types" is analogous to that described above for hydrophobic monomers.)

Sulfonic acid monomers comprise an organic group comprising a polymerizable moiety (e.g., a carbon-carbon double bond) and a $S(O_2)(OH)$ moiety (the metal ion binding moiety). The sulfonic acid monomer may have formula R'—$S(O)_2(OH)$, wherein R' is the organic group comprising the polymerizable moiety. Salts of the sulfonic acid monomer are also encompassed, i.e., in which the hydrogen of an OH group is replaced by a cation. Thus, "sulfonic acid monomer" also refers to a salt thereof. Illustrative R' groups include styrene, vinyl ($CH_2CH_2$), an alkyl (meth)acrylate, and an alkyl (meth)acrylamide. In embodiments, the alkyl group of the alkyl (meth)acrylate or the alkyl (meth)acrylamide has at least 1 carbon, at least 2 carbons, at least 3 carbons, at least 4 carbons, or from 1 to 6 carbons. Illustrative sulfonic acid monomers include styrene sulfonic acid, vinylsulfonate, 2-methacryloyloxymethane-1-sulfonic acid, 3-methacryoyloxypropane-1-sulfonic acid, 3-(vinyloxy)propane-1-sulfonic acid, ethylene sulfonic acid, 2-acrylamido-2-methyl-1-propanesulfonic acid, sulfoethyl methacrylate, sulfopropyl acrylate, sulfoethyl acrylate vinyl sulfuric acid, and 4-vinylphenyl sulfuric acid. In embodiments, the sulfonic acid monomer is styrene sulfonic acid (which also refers to a salt thereof, e.g., sodium styrene sulfonate). A single type or combinations of different types of sulfonic acid monomers may be used. (The meaning of "single type," "different types," and "one or more types" is analogous to that described above for hydrophobic monomers.)

In embodiments, the metal chelating monomers do not include those having an amine group.

Acidic monomers may be used to form the resin particles. Acidic monomers are monomers bearing an acidic moiety that is capable of deprotonating in water, thereby rendering the acidic monomer negatively charged in the water. However, the acidic monomers are distinguished from the disclosed metal chelating monomers and refer to monomers of a different type, i.e., a different chemical compound, as compared to the disclosed metal chelating monomers. In addition, the acidic monomers generally do not exhibit the metal ion binding abilities of the metal chelating monomers described above as the acidic monomers are generally characterized by greater $pK_a$ values. In embodiments, the acidic monomer has a $pK_a$ (in water at room temperature) of 4 or greater. In embodiments, the acidic monomer has a single $pK_a$, i.e., is capable of donating a single hydrogen ion. Illustrative acidic monomers include acrylic acid, methacrylic acid, ethacrylic acid, dimethylacrylic acid, maleic anhydride, maleic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, vinyl benzoic acid, and combinations thereof. As with the metal chelating monomers, the acidic monomers also encompass salts thereof. Similarly, a single type or combinations of different types of acidic monomers may be used. (The meaning of "single type," "different types," and "one or more types" is analogous to that described above for hydrophobic monomers.)

In embodiments, acidic monomers are used along with the metal chelating monomers (e.g., the phosphoric acid monomers and/or sulfonic acid monomers). In embodiments, the acidic monomers comprise (meth)acrylic acid. In embodiments, the acidic monomers do not include those having an amine group.

A variety of other monomers may be used to form the resin particles. For example, a monomer which is an ester of (meth)acrylic acid with an alcohol comprising a dioxane moiety or an alcohol comprising a dioxolane moiety may be used. In the present disclosure, this type of monomer may be referred to as an "dioxane/dioxolane monomer." This phrase, dioxane/dioxolane monomer, encompasses the monomer which is the ester of (meth)acrylic acid with the alcohol comprising the dioxane moiety, the monomer which is the ester of (meth)acrylic acid with the alcohol comprising the dioxolane moiety, and both such monomers. The dioxane moiety may be a 1,3-dioxane moiety and the dioxolane moiety may be a 1,3-dioxolane moiety. The alcohol comprising the dioxane/dioxolane moiety may be an acetal of a triol, a ketal of a triol, or a carbonate of a triol. Illustrative triols include glycerol and trimethylolpropane. The triol may be unsubstituted or substituted. By "substituted" it is meant that one or more bonds to a carbon(s) or hydrogen(s) are replaced by a bond to non-hydrogen and non-carbon atoms. The dioxane/dioxolane monomer may have Formula II (dioxane) or III (dioxolane) as shown below, wherein R is selected from hydrogen and methyl; R' is selected from hydrogen and ethyl; and Z is selected from hydrogen, an oxygen of a carbonyl group, an alkyl group, an aryl group, and an alkoxy group. Either or both types of monomers may be used in the resin particles.

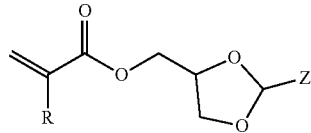

Formula II

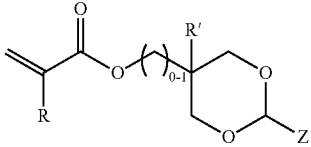

Formula III

The carbonyl group refers to a C=O group, that is Z is O covalently bound to the carbon via a double bond, thereby forming a carbonyl group between the two oxygens of the 5 or 6-membered ring. The alkyl group may be linear or branched. The alkyl group may have from 1 to 20 carbons. This includes having from 1 to 18 carbons and from 1 to 10 carbons, e.g., 1, 2, 3, 4, 5, 6, 7, 8, 9, or 10 carbons. The alkyl group may be substituted or unsubstituted. The aryl group may be monocyclic having one aromatic ring, e.g., benzene, or polycyclic having one or more fused rings. The aryl group may be unsubstituted or substituted as described above with respect to the alkyl group, although substituted aryl groups also encompass aryl groups in which a bond to a hydrogen(s) is replaced by a bond to an unsubstituted or substituted alkyl group as described above. The alkoxy group refers to an —O-alkyl group.

Illustrative dioxane/dioxolane monomers include glycerol formal (meth)acrylate, trimethylolpropane formal (meth)acrylate, and isopropylideneglycerol (meth)acrylate. A single type or combinations of different types of dioxane/dioxolane monomers may be used. In embodiments, however, the dioxane/dioxolane monomer is glycerol formal (meth)acrylate. Glycerol formal (meth)acrylate has a relatively high $T_g$ (about 85-90° C.). In the present disclosure, the name "glycerol formal (meth)acrylate" (as well as the names of the other dioxane/dioxolane monomers described in this paragraph) refers to either the dioxane isomer, the dioxolane isomer, or both. That is, all possibilities are encompassed by the names.

In embodiments, the hydrophobic monomers, the acidic monomers, and the dioxane/dioxolane monomers that are used are monofunctional, by which it is meant comprising a single polymerizable group.

Although not necessary, in some embodiments, multifunctional monomers, i.e., those comprising more than one polymerizable group (e.g., 2, 3, 4), may be used to form the resin particles. (The term "multifunctional monomer" is a term distinguished from a phosphoric acid monomer that may contain more than one polymerizable group.) Multifunctional monomers are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth)acrylates may be used, including those having a molecular weight in a range of from 214 g/mol to 1000 g/mol, from 214 g/mol to 500 g/mol, and from 214 g/mol to 300 g/mol. These molecular weight values may be determined using gel permeation chromatography. Other difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene (2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

In embodiments, however, the monomers which are used to form the resin particles do not include multifunctional monomers, e.g., polyfunctional acrylates. In embodiments, the monomers which are used to form the resin particles do not include a di(meth)acrylamide (e.g., diacetone diacrylamide). Similarly, in embodiments, crosslinking agents, e.g., epoxide containing compounds, are not used to form the resin particles.

Reactive surfactants may be used to form the resin particles. Suitable reactive surfactants comprise a polymerizable (and thus, reactive) group such that they become incorporated into the resin particles. Illustrative reactive surfactants include anionic ether sulfate reactive surfactants such as those in the commercially available Hitenol series. Suitable reactive surfactants include polyoxyethylene alkylphenyl ether ammonium sulfates including Hitenol BC-10, BC-20, BC10-25, BC-2020, BC-30; polyoxyethylene styrenated phenyl ether ammonium sulfates including Hitenol AR-10, AR-1025, AR-20, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In embodiments, other certain monomers are excluded in forming the resin particles. Monomers which may be excluded are unsaturated ethylene monomers having an alkyl group having from 12 to 22 carbons.

In forming the resin particles, various combinations of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles, including to achieve the values of the properties described below. Illustrative amounts are provided below.

If hydrophobic monomers are used in the monomer emulsion, the total amount of hydrophobic monomers used may be in a range from 70 weight % to 97 weight %, from 75 weight % to 95 weight %, or from 80 weight % to 92 weight %. (Here, weight % refers to the (total weight of hydrophobic monomers)/(total weight of monomers in the monomer emulsion, excluding the reactive surfactants) *100). When present, the alkyl (meth)acrylate (e.g., methyl (meth)acrylate, ethyl (meth)acrylate), butyl (meth)acrylate) may be present at an amount of at least 15 weight %, at least 20 weight %, at least 25 weight %, at least 30 weight % or in a range of from 15 weight % to 35 weight %. (Weight % has a meaning analogous to that described for hydrophobic monomers.)

The total amount of metal chelating monomers and acidic monomers used in the monomer emulsion may be at least 8 weight %, at least 10 weight %, at least 15 weight %, or at least 18 weight % In embodiments, the total amount of metal chelating monomers and acidic monomers is less than 18 weight % or less than 17 weight %. These ranges encompass amounts from 8 weight % to 25 weight %, from 8 weight % to 20 weight %, from 8 weight % to 18 weight %, and from 10 weight % to 18 weight %. (Weight % has a meaning analogous to that described for hydrophobic monomers.) The total amount of phosphoric acid monomers or sulfonic acid monomers or both used in the monomer emulsion may be at least 1 weight %, at least 2 weight %, at least 3 weight %, or at least 4 weight %. In embodiments, the total amount of phosphoric acid monomers or sulfonic acid monomers or both is less than 10 weight % or less than 8 weight %. These ranges encompass amounts of from 1 weight % to 10 weight %, from 1 weight % to 8 weight %, from 1 weight % to 6 weight %, from 2 weight % to 10 weight %, from 2 weight % to 8 weight %, and from 2 weight % to 6 weight %. (Weight % has a meaning analogous to that described for hydrophobic monomers.) As noted above, in embodiments, an acidic monomer is used in addition to the phosphoric acid monomer, sulfonic acid monomer, or both. In such embodiments, a weight ratio of the total amount of the phosphoric acid monomers, sulfonic acid monomers, or both, to the total amount of the acidic monomers is 1.0 or less, less than 0.9, less than 0.8, less than 0.7, less than 0.6, less than 0.5, less than 0.4, or in a ratio of from 0.1 to 1.0, 0.1 to 0.8, or 0.1 to 0.5.

If a dioxane/dioxolane monomer is used in the monomer emulsion, the total amount of dioxane/dioxolane monomers may be in a range of from 1 weight % to 40 weight %, 1 weight % to 30 weight %, 1 weight % to 20 weight %, from 1 weight % to 10 weight %, and from 1 weight % to 5 weight %. (Weight % has a meaning analogous to that described for hydrophobic monomers.)

If a multifunctional monomer is used in the monomer emulsion, the total amount of multifunctional monomers may be in a range of from 0.001 weight % to 1 weight %, from 0.001 weight % to 0.8 weight %, and from 0.01 weight % to 0.6 weight %. (Weight % has a meaning analogous to that described for hydrophobic monomers.)

If a reactive surfactant is used in the monomer emulsion, the total amount of reactive surfactant may be in a range of from 0.1 weight % to 6.5 weight %. (Here, weight % refers to the (total weight of reactive surfactants)/(total weight of monomers in the monomer emulsion, including the reactive surfactant monomers)*100). This range includes from 0.3 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent, and metal chelating monomers, e.g., phosphoric acid monomers, sulfonic acid monomers, or both phosphoric acid and sulfonic acid monomers. In embodiments, the monomer emulsion comprises (or consists of) a solvent, hydrophobic monomers and metal chelating monomers, including phosphoric acid monomers, sulfonic acid monomers, or both phosphoric acid and sulfonic acid monomers. In embodiments, the hydrophobic monomers comprise styrene and an alkyl (meth)acrylate, e.g., butyl acrylate. In embodiments, the phosphoric acid monomers comprise those having formula $P(O)(OR)_3$, wherein each R is independently selected from a hydrogen and an organic group, wherein at least one R is the organic group. In embodiments, the organic group is an alkyl (meth)acrylate. In embodiments, the organic group has Formula I. In embodiments, the phosphoric acid monomers comprise phosphoric acid 2-hydroxyethyl methacrylate ester, bis[2-(methacryloyloxy)ethyl] phosphate, or a combination thereof. In embodiments, the phosphoric acid monomers comprise a phosphate ester of polyethylene glycol mono (meth)acrylate, a phosphate ester of polypropylene glycol mono(meth)acrylate, or a combination thereof. In embodiments, the sulfonic acid monomers comprise those having formula $R'—S(O)_2(OH)$, wherein R' is an organic group. In embodiments, the sulfonic acid monomers comprise styrene sulfonic acid. In any of the embodiments in this paragraph, an acidic monomer may be used, e.g., methacrylic acid. In any of the embodiments in this paragraph, a dioxane/dioxolane monomer may be used (e.g., glycerol formal methacrylate). In any of the embodiments in this paragraph, a multifunctional monomer may be used (although in some embodiments, no multifunctional monomer is used). In any of the embodiments in this paragraph, a reactive surfactant (e.g., an anionic ether sulfate) may be used. In any of the embodiments in this paragraph, a chain transfer agent may be used. In any of the embodiments in this paragraph, amounts of the various monomers, reactive surfactants, and chain transfer agents may be used as described above. The balance may be made up of the solvent.

In embodiments, the monomer emulsion is free of (i.e., does not comprise) a surfactant. However, in other embodiments, a surfactant may be used. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide.

In embodiments, the monomer emulsion is free of (i.e., does not comprise) inorganic particles such as silica particles. Commercially available silica particles which may be excluded are the following: various grades of LUDOX Colloidal Silica such as FM, SM, HS-30, HS-40, LS, TM-40, TM-50, SM-AS, AS-30, AS-40, AM, HSA, TMA, P X-30, P t-40, P W-50, CL, and CL-P; and various grades of Nissan Chemical Silica such as SNOWTEX ST-20L, ST-30, ST-40, ST-50, ST-OS, ST-O, ST-O-40, ST-OL, ST-C, ST-C-30, ST-CM, ST-N, STN30G, ST-N40, ST-NS, ST-XS, ST-S, ST-UP, ST-O-UP, MA-ST-UP, ST-PS-S, AMT-330S, HX-305M1, and HX-305M5.

Various polymerization techniques may be used to form the resin particles such as monomer-starved emulsion polymerization, conventional emulsion polymerization, suspension polymerization, mini-emulsion polymerization, nano-emulsion polymerization, seeded-emulsion polymerization, and microemulsion polymerization. These polymerization techniques may make use of any of the monomer emulsions described above. An illustrative monomer-starved emulsion polymerization process is described below. It is noted, however, that the polymerization technique used provides the polymerized polymer in the form of particles which are insoluble in aqueous media. This is by contrast to polymerization techniques, e.g., solution polymerization, including those described in U.S. Pat. No. 9,963,592, which provide solubilized polymers in organic media.

An illustrative method of making the resin particles comprises adding any of the monomer emulsions described above to a reactive surfactant solution at a feed rate over a period of time. The reactive surfactant solution comprises a solvent and a reactive surfactant. Any of the solvents and any of the reactive surfactants described above may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 0.1 to 10 weight % and from 0.5 weight % to 5 weight %. (Here, weight % refers to the (total weight of reactive surfactants)/(total weight of reactive surfactant solution)*100.) The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to, or after, the addition of the monomer emulsion. An additional amount of a separate initiator solution may be added after the addition of the monomer emulsion. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64TM, 2-methyl 2-2'-azobis propanenitrile, VAZO 88TM, 2-2'- azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine]tetrahydrochloride, 2,2'-azobis[2-methyl-N-(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochlo-ride, 2,2'-azobis[2-(5-hydroxy-3,4,5,6-tetrahydropyrimidin-2-yl)propane]di-hydrochloride, 2,2'-azobis {2-[1-(2-hydroxyethyl)-2-imidazolin-2-yl]propane}dihydrochloride, and combinations thereof. The initiator may be used in an amount in a range of from 0.05 weight % to 2.5 weight %. (Here, weight % refers to the (total weight of initiators)/(total weight of reactive surfactant solution or the total weight of initiator solution)*100.)

In embodiments, the reactive surfactant solution comprises (or consists of) a solvent (e.g., water), a reactive surfactant, and optionally, one or more of an initiator and a buffer. In any of these embodiments, amounts of the reactive surfactants, initiator, and buffer may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any of the inorganic particles described above. As a result, the resin particles may be characterized as being free of (i.e., not comprising) any of the surfactants and/or any of the inorganic particles described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion is added at a feed rate over a period of time. In the presence of the initiator, the monomers of the monomer emulsion undergo polymerization reactions to form the resin particles. The feed rate is sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time, with or without the addition of additional initiator. Illustrative additional periods of time include those in a range of from 1 hour to 18 hours. Both the addition of the monomer emulsion and the polymerization after addition may be carried out under the inert gas and at the elevated temperature. Optionally, the resulting latex comprising the resin particles may be processed by standard techniques such as coagulation, dissolution and precipitation, filtering, washing, or drying. The processed or unprocessed latex may be used to form the inkjet primer compositions.

The monomer-starved emulsion polymerization process described above does not involve the use of a resin seed in forming the resin particles. However, as noted above, seeded-emulsion polymerization techniques may be used.

The methods may further comprise forming the monomer emulsion, forming the reactive surfactant solution, and/or forming the initiator solution. Each may be formed by combining the desired components at the desired amounts and mixing.

The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the reactants include metal chelating monomers such as phosphoric acid monomers, sulfonic acid monomers, or both phosphoric acid and sulfonic acid monomers, but otherwise, the selection of other monomers is not particularly limited. For clarity, the composition of the resin particles may be identified by reference to the monomers which are polymerized, recognizing that the chemical form of those monomers is generally altered as a result of the polymerization reactions. Once polymerized in the resin particles, monomers may be referred to as "polymerized monomers."

In embodiments, the resin particles comprise (or consist of) the polymerization product (e.g., copolymer) of reactants comprising metal chelating monomers, e.g., phosphoric acid monomers, sulfonic acid monomers, or both phosphoric acid and sulfonic acid monomers. In embodiments, the resin particles comprise (or consist of) the polymerization product (e.g., copolymer) of reactants comprising hydrophobic monomers and metal chelating monomers, including phosphoric acid monomers, sulfonic acid monomers, or both phosphoric acid and sulfonic acid monomers. In embodiments, the hydrophobic monomers comprise styrene and an alkyl (meth)acrylate, e.g., butyl acrylate. In embodiments, the phosphoric acid monomers comprise those having formula $P(O)(OR)_3$, wherein each R is independently selected from a hydrogen and an organic group, wherein at least one R is the organic group. In embodiments, the organic group is an alkyl (meth)acrylate. In embodiments, the organic group has Formula I. In embodiments, the phosphoric acid monomers comprise phosphoric acid 2-hydroxyethyl methacrylate ester, bis[2-(methacryloyloxy)ethyl] phosphate, or a combination thereof. In embodiments, the phosphoric acid monomers comprise a phosphate ester of polyethylene glycol mono(meth)acrylate, a phosphate ester of polypropylene glycol mono(meth)acrylate, or a combination thereof. In embodiments, the sulfonic acid monomers comprise those having formula $R'—S(O)_2(OH)$, wherein R' is an organic group. In embodiments, the sulfonic acid monomers comprise styrene sulfonic acid. In any of the embodiments in this paragraph, an acidic monomer may be used, e.g., methacrylic acid. In any of the embodiments in this paragraph, a dioxane/dioxolane monomer may be used (e.g., glycerol formal methacrylate). In any of the embodiments in this paragraph, a multifunctional monomer may be used (although in some embodiments, no multifunctional monomer is used). In any of the embodiments in this paragraph, a reactive surfactant (e.g., an anionic ether sulfate) may be used. In any of the embodiments in this paragraph, an initiator (or a portion thereof) may be incorporated at an end of each polymer chain in the resin particles. In any of the embodiments in this paragraph, the resin particles may be crosslinked.

In any of the embodiments in the paragraph immediately above, the polymerized monomers may be present in the resin particles in the amounts described above with respect to the amounts of monomers in the monomer emulsion. This is because experiments have shown that the conversion of the monomers during the polymerization reactions is above 99.9%. For example, the total amount of polymerized metal chelating monomers and acidic monomers in the resin particles may be in a range of from 8 weight % to 25 weight %. Analogous to the definition of weight % provided above, when referring to the resin particles, the term weight % refers to (total weight of polymerized metal chelating monomers and acidic monomers)/(total weight of polymerized monomers, excluding polymerized reactive surfactants) *100).

Using a specific, illustrative composition, the composition of the resin particles may be identified as poly[(styrene)-ran-(butyl acrylate)-run-(phosphoric acid 2-hydroxyethyl methacrylate ester)-run-(bis[2-(methacryloyloxy)ethyl] phosphate)-run-(methacrylic acid)-run-(anionic ether sulfate)]. As another specific, illustrative composition, the composition of the resin particles may be identified as poly[(styrene)-run-(butyl acrylate)-ran-(glycerol formal (meth)acrylate)-run-(styrene sulfonic acid)-run-(methacrylic acid)-run-(anionic ether sulfate)]. In these descriptions, the different chemical moieties which result from the polymerization reactions is identified by reference to the corresponding monomer in its parenthesis and "run" refers to the random incorporation of the different monomers into the copolymer. The use of this description encompasses the presence of an initiator (or portion thereof) at the beginning of each copolymer as well as crosslinking (if used).

In embodiments in which certain monomers (or other reactants) are excluded from forming the resin particles, it follows that such monomers (or other reactants) do not participate in the polymerization reactions to form the polymeric matrix of the resin particles. Thus, in these embodiments, the resin particles may be described as being free of (i.e., not comprising) one or more of 4-methylstyrene, cyclohexyl acrylate, isobornyl methacrylate, isobornyl acrylate, a di(meth)acrylamide (e.g., diacetone acrylamide), and an unsaturated ethylene monomer having an alkyl group having from 12 to 22 carbons.

Resin particles may be present in the inkjet primer composition in an amount in a range of from 1 weight % to 20 weight %, from 1 weight % to 10 weight %, from 5 weight % to 10 weight %, and from 1 weight % to 5 weight %. (Here, weight % refers to the (total weight of resin particles)/(total weight of inkjet primer composition)*100.) This range includes from 5 weight % to 10 weight %.

The resin particles of the inkjet primer composition may be characterized by their size. The size of the particles may be reported as a $D_{50}$ particle size, which refers to a diameter at which 50% of the sample (on a volume basis) is comprised of particles having a diameter less than said diameter value. The $D_{50}$ particle size may be measured using a Malvern Zetasizer Nano ZS. For check of light scattering techniques and methods, NIST polystyrene Nanosphere control samples having a diameter within the range of 20 nm to 200 nm available from Microspheres-Nanospheres (a Corpuscular company of Microtrac) or third-party vendors (such as ThermoFisher Scientific) may be used. In embodiments, the resin particles are characterized by a $D_{50}$ particle size of from 50 nm to 120 nm. This includes from 60 nm to 110 nm, and from 70 nm to 100 nm. Thus, resin particles are distinguished from individual polymer molecules.

The resin particles of the inkjet primer composition may also be characterized by their $T_g$ values. The $T_g$ values may be measured using a Differential Scanning calorimetry (DSC) TA Instruments Discovery DSC 2500. In embodiments, the $T_g$ is in a range of from 40° ° C. to 100° C. This includes from 50° C. to 90° C., and from 60° C. to 80° ° C.

The resin particles of the inkjet primer composition may also be characterized by their charge. In embodiments, the resin particles are negatively charged in the inkjet primer composition, which may have a pH of from greater than 7 to 10, from greater than 7 to 9, or from 7.5 to 9. As described above, this negative charge is due to the use of the metal chelating monomers and/or the acidic monomers.

Water

The water content of the inkjet primer compositions may be at least 40 weight %. This includes at least 50 weight %, at least 60 weight %, and at least 70 weight %. These weight % refer to the weight of water as compared to the total weight of the inkjet primer composition.

Co-Medium

In addition to water, the inkjet primer compositions comprise a co-medium. Any of the co-media described in "Liquid System" below may be used, including the water-soluble organic liquids, water-miscible organic liquids, and humectants described below. In embodiments, however, the inkjet primer compositions comprise a 1,2-alcohol (e.g., 1,2-hexanediol), a glycol (e.g., propylene glycol), and glycerol.

The total amount of co-medium(media) being used in the inkjet primer composition may be in a range of from 20 weight % to 50 weight %, from 20 weight % to 45 weight %, and from 20 weight % to 35 weight %. These weight % refer to the weight of co-medium(media) (e.g., a 1,2-alcohol (e.g., 1,2-hexanediol), a glycol (e.g., propylene glycol), and glycerol) as compared to the total weight of the inkjet primer composition.

Additives

The inkjet primer composition may further comprise a surfactant. Any of the surfactants described in "Surfactant" below may be used. In embodiments, the surfactant is a silicone surfactant. If a surfactant is used, it may be present in an amount of from 0.01 weight % to 2 weight %. (Here, weight % refers to the (total weight of surfactant)/(total weight of inkjet primer composition)*100.) If more than one type of surfactant is used, these amounts refer to the total amount of surfactant.

The inkjet primer composition may further comprise an additive. Any of the additives described in "Additives" below may be used. In embodiments, the inkjet primer composition comprises a wetting agent, a defoamer, or both. If an additive is used, it may be present in an amount of from 0.01 weight % to 5 weight %. (Here, weight % refers to the (total weight of additive)/(total weight of inkjet primer composition)*100.) If more than one type of additive is used, these amounts refer to the total amount of additive.

In embodiments, the inkjet primer composition may be described as being free of (i.e., not comprising) any of the water-soluble resin or emulsions, water-borne binders, polymeric dispersants described below.

In embodiments, the inkjet primer composition may be described as being free of (i.e., not comprising) a resin/polymer other than what is provided by the resin of the present resin particles themselves.

Since the resin/polymer making up the resin particles has already been polymerized, the inkjet primer composition itself is generally not curable and as such, is free of (i.e., does not comprise) an initiator. This does not preclude the presence of a minor amount of unreacted initiator or reacted initiator which may be incorporated into polymer chains of the resin particles. Similarly, the inkjet primer composition may be described as being free of (i.e., not comprising) monomers.

In embodiments, the inkjet primer composition may also be described as being free of (i.e., not comprising) components such as a boric acid, diglycolic acid, a molecular chelating agent (e.g., ethylenediaminetetraacetic acid (EDTA)), or combinations thereof. In this embodiment, exclusion of a molecular chelating agent does not refer to excluding the metal chelating monomers, e.g., phosphoric acid monomer and/or the sulfonic acid monomer, (which are polymerized into the resin particles).

In embodiments, the inkjet primer composition may also be described as being free of (i.e., not comprising) a wax, including any of the waxes described below.

In embodiments, the inkjet primer composition may also be described as being free of (i.e., not comprising) a non-polymerizable (i.e., not having a polymerizable group) multivalent cation or salt thereof, including Ca, Mg (or the like), or a salt thereof. In embodiments, the inkjet primer composition may also be described as being free of (i.e., not comprising) a non-polymerizable (i.e., not having a polymerizable group) organic acid, including acetic acid (or the like).

In embodiments, the inkjet primer composition may also be described as being free of (i.e., not comprising) a dihydrazide.

In embodiments, the inkjet primer composition may also be described as being free of (i.e., not comprising) a polyvinyl alcohol.

The inkjet primer compositions are distinguished from the aqueous inkjet ink compositions described herein (and similar compositions) by not comprising a colorant (including any of the colorants described below). As noted above, the inkjet primer compositions are colorless.

The inkjet primer compositions are also distinguished from latexes which do not comprise co-medium(media) at amounts sufficient to allow the latex to be printed via an inkjet printing system.

In embodiments, an inkjet primer composition comprises (or consists of) water; a co-medium; resin particles; and optionally, one or more of a surfactant, a wetting agent, and a defoamer. In any of these embodiments, the components may be selected from any of the co-media, resin particles, surfactants, wetting agents, and defoamers disclosed herein. In any of these embodiments, amounts of the components may be used as described above.

The inkjet primer compositions may be formed by combining the desired components at the desired amounts and mixing. An illustrative method comprises adding any of the disclosed resin particles (or latex comprising the resin particles) to a mixture comprising a co-medium(media) and an additive(s). Mixing and/or heating may be used. The inkjet primer composition may be filtered prior to use. Illustrative details are provided in the Examples, below.

Properties

Inkjet primer compositions may be characterized by their viscosities. The viscosity values may refer to that measured using a Tuning fork vibration viscometer (Cole-Parmer) and measured within a day of forming the inkjet primer composition at 37° C. The viscosity may be less than 10 cP, or in a range of from 1 to 15 cP, which includes from 2 to 10 cP and from 3 to 8 cP. These viscosities indicate that the inkjet primer composition is printable, i.e., jettable via an inkjet printing system. Such values distinguish the inkjet primer composition from other primer compositions which have significantly higher viscosities, e.g., more than 50 cP. 100 cP, or 1000 cP, none of which are printable via an inkjet printing system.

Inkjet primer compositions may be characterized by a gloss differential they provide an aqueous inkjet ink composition subsequently printed onto an ink-receiving layer formed from the inkjet primer composition. Gloss differential may be measured as described in the Examples, below. In embodiments, the inkjet primer composition affords a subsequently printed aqueous inkjet ink composition (i.e., printed image) with a gloss differential of less than 3 units, less than 2 units, less than 1 unit, or in a range of 1 to 3 units. As demonstrated in the Examples, below, these values are significantly smaller than gloss differentials obtained from an aqueous inkjet ink composition printed directly onto a substrate without the ink-receiving layer.

Aqueous Inkjet Ink Compositions

Any of the resin particles described above may also be used to provide an aqueous inkjet ink composition. The term "inkjet" in "aqueous inkjet ink composition," means that the composition is printable, i.e., jettable, by an inkjet printing system, as described above with respect to the inkjet primer compositions. The aqueous inkjet ink composition generally comprises the resin particles, a liquid system, a colorant, and optionally, one or more of a wax and an additive. Thus, unlike the inkjet primer composition, the aqueous inkjet ink compositions are colored.

The precise chemical composition of the resin particles being used in the aqueous inkjet ink composition may differ from the resin particles being used in the inkjet primer composition. However, in embodiments, both sets of resin particles may comprise metal chelating monomers, e.g., including those selected from the metal chelating monomers described above in the amounts described above. This represents a different approach as existing approaches generally make use of primers having significantly different chemical compositions as compared to subsequently applied ink compositions. In embodiments, the resin particles in the aqueous inkjet ink composition and the resin particles being used in an inkjet primer composition to be printed prior to the aqueous inkjet ink composition, are both negatively charged in their respective compositions, which may have a pH within the ranges described above. Again, this represents a different approach as existing approaches have made use of primers having components with a charge opposite to that of components in subsequently applied ink compositions. In embodiments, the resin particles in the aqueous inkjet ink composition are the same as the resin particles (i.e., same components used at same amounts) being used in an inkjet primer composition to be printed prior to the aqueous inkjet ink composition.

The resin particles may be present in the aqueous inkjet ink composition in an amount in a range of from 1 weight % to 10 weight % and from 5 weight % to 10 weight %. (Here, weight % refers to the (total weight of resin particles)/(total weight of aqueous inkjet ink composition)*100.) This range includes from 5 weight % to 10 weight %.

The other compositions of the aqueous inkjet ink compositions are described below.

Liquid System

The aqueous inkjet ink compositions comprise a liquid system based on water. The liquid system may comprise a mixture of water and one or more of a water-soluble organic liquid, a water-miscible organic liquid, and a humectant. The water-soluble organic liquids, water-miscible organic liquids, and humectants may be referred to herein as co-media. Suitable such co-media include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, hexyl glycol, glycerine, dipropylene glycols, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,3-butanediol, 1,4-butanediol, and 2,4-heptanediol. Other suitable co-media include amides, ethers, urea, substituted ureas such as thiourea, ethylene urea, allylurea, allylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these co-media may be used.

Suitable co-media include a glycol of hydrocarbons having a carbon number of 4 to 7. Examples of such a glycol include 1,2-pentanediol; 1,2-hexanediol; 1,5-pentanediol; 1,6-hexanediol; 3-methyl-1,3-butanediol; 1,2-butanediol; 2,4-pentanediol; 1,7-heptanediol; 3-methyl-1,5-pentanediol; trimethylolpropane; ethyleneurea; 1,2,6-hexantriol; 1,2,3-butanetriol; sorbitol; diethylene glycol; 1,2,4-butanetriol; glycerol; diglycerol; and triethylene glycol.

In embodiments, the liquid system comprises water, a 1,2-alcohol (e.g., 1,2-hexanediol), a 1,5-alcohol (1,5-pentanediol), a glycol (e.g., propylene glycol), and glycerol.

In liquid systems comprising water and a co-medium, the water to co-medium weight ratio, as well as the type and relative amount of different co-media, may be selected to achieve certain properties for the aqueous inkjet ink composition such as a desired surface tension, viscosity, etc. In embodiments, the water to co-medium weight ratio is from 90:10 to 51:49. If more than one co-medium is used, these weight ratios refer to the total amount of co-medium. These weight ratios refer to the total amount of water in the aqueous inkjet ink composition.

Similarly, various total amounts of the liquid system may be used in the aqueous inkjet ink compositions. In embodiments, the liquid system is present in an amount of from 50 weight % to 95 weight %, from 60 weight % to 90 weight %, or from 65 weight % to 90 weight %. (Here, weight % refers to the (total weight of liquid system)/(total weight of aqueous inkjet ink composition)*100.) In embodiments, the total amount of water present is at least 50 weight %, at least 60 weight %, at least 70 weight %, at least 80 weight %, or in a range of from 50 weight % to 95 weight %. (Here, weight % refers to the (total weight of water)/(total weight of aqueous inkjet ink composition)*100.)

Colorant

The aqueous inkjet ink compositions comprise a colorant. As such, the aqueous inkjet ink compositions cannot be described as being colorless. Instead, the aqueous inkjet ink compositions are colored, e.g., black, white, blue, red, yellow, etc. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7. FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include white pigments, black pigments, cyan pigments, magenta pigments, and yellow pigments. Pigments can be organic or inorganic particles. Suitable inorganic pigments include carbon black. However, other inorganic pigments may be suitable such as cobalt blue ($CoO-Al_2O_3$), chrome yellow ($PbCrO_4$), iron oxide, titanium dioxide ($TiO_2$), $BaSO_4$. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation). Other pigments include Kodak Specialty Dispersion pigments available from Kodak, Inc. These include Specialty Black Dispersion Type P2, Specialty Cyan Dispersion Type P2, Specialty Yellow Dispersion Type P2, Specialty Magenta Dispersion Type P3, Specialty Black Dispersion Type P4, Specialty Cyan Dispersion Type P1, Specialty Magenta Dispersion Type P1, and Specialty Yellow Dispersion Type P1. In embodiments, the colorant is not any of the quinacridone-based pigments disclosed in U.S. Pat. No. 9,359,522.

The above list of pigments includes unmodified pigment particulates, small molecule attached pigment particulates, self-dispersed pigment particulates, and polymer-dispersed pigment particulates.

In forming the aqueous inkjet ink compositions, the colorant(s) may be provided as a colorant dispersion comprising the colorant and a liquid (e.g., water). The colorant may be in the form of a particle and have an average particle size of from 20 nm to 500 nm, from 20 nm to 400 nm, or from 30 nm to 300 nm.

Various amounts of colorant may be used in the aqueous inkjet ink compositions. Generally, however, an amount is selected such that the total solids content (generally provided by the resin particles, the colorant, and if present, a wax) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

A feature of at least embodiments of the aqueous inkjet ink compositions is that the resin particles are freely dispersed in the ink as opposed to being attached to, adsorbed on, or coated onto the colorant (e.g., pigment) of the ink. This may be confirmed by viscosity measurements to confirm that the viscosity of the aqueous inkjet ink composition remains unchanged over extended periods of time and at elevated temperatures. By "unchanged" it is meant within +5% of an initial viscosity value. Similarly, this may be confirmed by measurements showing that the $D_{50}$ particle size remains unchanged over extended periods of time and at elevated temperatures (here, "unchanged" has a meaning analogous to unchanged viscosity).

Wax

The aqueous inkjet ink composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used. Waxes from Michelman may be used (e.g., Michem Lube 103DI, 124, 124P135,156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer 532, Aquacer 535, Aquacer 537, Aquacer 539, and Aquacer 593. In embodiments, the wax is an anionic nanoscale wax emulsion such as Michem Lube 190.

Various amounts of wax may be used in the aqueous inkjet ink compositions. Generally, however, an amount is selected such that the total solids content of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

Surfactant

The aqueous inkjet ink compositions may comprise one or more surfactants. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-S-7, Tergitol™ 15-S-9. TMN-6. TMN-100x and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-761p. S-764p, Silsurf® A008, Siltec® C-408, BYK 345, 346, 347, 348 and 349, polyether siloxane copolymer TEGO® Wet-260, 270 500, etc. Some amphoteric fluorinated surfactants can also be used such as alkyl betaine fluorosurfactant or alkyl amine oxide fluorosurfactant such as Chemguard S-500 and Chemguard S-111. Other surfactants which may be used include Surfynol PSA 336, Surfynol SE-F, and Surfynol 107L.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition)*100.) If more than one type of surfactant is used, these amounts refer to the total amount of surfactant.

Additives

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; anti-foam agents; defoamers; and wetting agents. However, generally, no molecular chelating agents (e.g., EDTA) are included. (Exclusion of a molecular chelating agent does not refer to excluding the metal chelating monomers, e.g., the phosphoric acid monomer or the sulfonic acid monomer (which are polymerized into the resin particles).) In embodiments, the aqueous inkjet ink composition comprises a surfactant, a wetting agent, a defoamer, or a combination thereof.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

In embodiments, the aqueous inkjet ink compositions are free of (i.e., do not comprise) a molecular chelating agent (e.g., EDTA). (Exclusion of a molecular chelating agent does not refer to excluding the metal chelating monomers, e.g., the phosphoric acid monomer or the sulfonic acid monomer (which are polymerized into the resin particles).)

The aqueous inkjet ink composition does not necessarily require the addition of an additive to further adjust viscosity. This can mean that the aqueous inkjet ink compositions may be free of (i.e., do not comprise) a water-soluble resin or emulsion, a water-borne binder, a polymeric dispersant, and combinations thereof. This includes the possible exclusion of any of the water-soluble resin or emulsions, water-borne binders, polymeric dispersants described below. However, it is understood that in some embodiments, such compounds may be included. Finally, it is noted that none of the terms water-soluble resin, water-soluble emulsion, water-borne binder, and polymeric dispersant encompass the present resin particles themselves.

Illustrative water-soluble resins/emulsions are polyethylene glycol and polyvinylpyrrolidone.

Illustrative water-borne binders are Rhoplex I-1955, Rhoplex I-2426D, Rhoplex I-62. Rhoplex 1-98, Rhoplex E-1691, available from Rhohm & Haas. Others include Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP. Other exemplary water-borne binders include those available from Johnson Polymers (BASF) such as Joncryl 537, Joncryl H538, Joncryl H538.

Illustrative polymeric dispersants are acrylic polymers such as styrene-acrylic copolymers and vinylpyrrolidone copolymers, urethane or polyurethane dispersions, and acrylic-urethane hybrid dispersions. More specific polymeric dispersants include those available from Johnson Polymers (BASF) such as Joncryl® 671, Joncryl® 683, Joncryl® 296, Joncryl® 690, Joncryl HPD 296, Joncryl HPD96-E, Joncryl LMV 7085, Joncryl 8082. Other dispersants include those described in EP Patent No. 2097265, which is incorporated by reference for purposes of the dispersants, and those described in U.S. Patent Application No. 2019284414, which is incorporated by reference for purposes of the dispersants.

Similarly, the aqueous inkjet ink compositions may be free of (i.e., do not comprise) a resin other than those provided by the resin of the present resin particles. A single type of resin may be used. Similarly, the aqueous inkjet ink composition itself is generally not curable and as such, is free of (i.e., does not comprise) an initiator. It is noted that any other exclusions referenced above with respect to the resin particles and latex may be applied to embodiments of the aqueous inkjet ink compositions.

In embodiments, an aqueous inkjet ink composition comprises (or consists of) a liquid system; resin particles; a colorant; and optionally, one or more of a wax and an additive. In embodiments, the ink composition comprises (or consists of) a liquid system; resin particles; a colorant; a wax; and optionally, an additive. In any of these embodiments, the additives may be selected from a stabilizer, a surfactant, a defoamer, and a wetting agent. In any of these embodiments, the components may be selected from any of the liquid systems, resin particles, colorants, waxes, and additives disclosed herein. In any of these embodiments, amounts of the components may be used as described above. Regarding the resin particles, in embodiments, the composition of the resin particles may be identified as poly[(styrene)-ran-(butyl acrylate)-ran-(phosphoric acid 2-hydroxyethyl methacrylate ester)-ran-(bis[2-(methacryloyloxy)ethyl] phosphate)-ran-(methacrylic acid)-ran-(anionic ether sulfate)]. In embodiments, the composition of the resin particles may be identified as poly[(styrene)-ran-(butyl acrylate)-run-(glycerol formal (meth)acrylate)-ran-(styrene sulfonic acid)-ran-(methacrylic acid)-ran-(anionic ether sulfate)]. The use of this description encompasses the presence of an initiator (or portion thereof) at the beginning of each copolymer as well as crosslinking (if used). In these embodiments, the amounts of the polymerized monomers may be within the ranges described above in "Inkjet Primer Compositions."

The aqueous inkjet ink compositions may be formed by combining the desired components at the desired amounts and mixing. An illustrative method comprises adding any of the disclosed resin particles (or latex comprising the resin particles) to a colorant dispersion to form a first mixture; and adding a second mixture comprising a liquid system and an additive(s) to the first mixture to form the aqueous inkjet ink composition. A third mixture comprising a wax may be added to the combined first and second mixtures. Mixing and/or heating may be used during the method. The aqueous inkjet ink composition may be filtered prior to use. Illustrative details are provided in the Examples, below.

Properties

The aqueous inkjet ink compositions may be characterized by their viscosities. The viscosities may be measured and be within the ranges as described above with respect to "Inkjet Primer Compositions."

Inkjet Printing

As noted above, the disclosed inkjet primer compositions may be printed onto a substrate to form an ink-receiving layer thereon. Printing may be accomplished by any type of inkjet printing system. The inkjet printing system may be configured to employ a thermal inkjet printing process wherein the inkjet primer composition in the nozzles is selectively heated in an imagewise pattern, thereby causing droplets of the inkjet primer composition to be ejected in imagewise pattern. Alternatively, the inkjet printing system may be configured to employ an acoustic inkjet printing process wherein droplets of the inkjet primer composition are caused to be ejected in imagewise pattern by acoustic beams. In yet another embodiment, the inkjet printing system may be configured to employ a piezoelectric inkjet process, wherein droplets of the inkjet primer composition are caused to be ejected in imagewise pattern by oscillations of piezoelectric vibrating elements. The form and dimensions of the imagewise pattern formed from the inkjet primer composition are not limited and thus, the ink-receiving layer may have various forms and dimensions, including text, a graphic, etc.

Next, any of the disclosed aqueous inkjet ink compositions may be printed onto the ink-receiving layer. Printing of the aqueous inkjet ink composition also proceeds using any of the disclosed inkjet printing systems, generally using the same inkjet printing system and the same printhead that was used to form the ink-receiving layer. The image printed onto the previously printed ink-receiving layer using the aqueous inkjet ink composition may be of the same form/dimensions as the previously printed ink-receiving layer or may have a different form/dimensions. Heating may be used to remove water and co-media from ink-receiving layers and printed images, either between printing the inkjet primer composition and printing the aqueous inkjet ink composition, or after printing the aqueous inkjet ink composition, or both.

Also encompassed by the present disclosure is an inkjet set comprising any of the disclosed inkjet primer compositions and any of the disclosed aqueous inkjet ink compositions. The inkjet set may be provided via one or more channels of a printhead mountable or mounted to any of the disclosed inkjet printing systems.

The disclosed inkjet primer compositions and aqueous inkjet ink compositions may be printed onto any suitable substrate. Illustrative substrates include paper, including offset coated paper and corrugated paper, and plastic. Also encompassed by the present disclosure is a substrate having a surface, an ink-receiving layer on (including directly on) the surface, and a printed image on (including directly on) the ink-receiving layer. As noted above, the ink-receiving layer is formed by printing any of the disclosed inkjet primer compositions onto the substrate and the printed image is formed by printing any of the disclosed aqueous inkjet ink compositions onto the ink-receiving layer. The ink-receiving layer comprises the resin particles which were present in the inkjet primer composition. Other components of the inkjet primer composition may be present in the ink-receiving layer although generally, the water and co-media have been removed due to evaporation/heating. Similarly, the printed image comprises the resin particles which were present in the aqueous inkjet ink composition, as well as the colorant. Other components of the aqueous inkjet ink composition may be present in the printed image although generally, the water and co-media have been removed due to evaporation/heating.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Examples 1-2

A reactive surfactant solution of either Hitenol AR-1025 or AR-20 (both polyoxyethylene styrenated ether ammonium sulfate) from Montello was prepared by mixing in a glass reactor. The amounts of these components used are shown in Table 1, below. The reaction was then purged with nitrogen for 30 minutes. The reactor was then continuously purged with nitrogen while being stirred at 250 rpm. The reactor was then heated to 75° ° C. and held there. Separately, a monomer emulsion was prepared by combining deionized water and the selected monomers and mixing to form an emulsion. The selected monomers and their amounts are shown in Table 1, below. Separately, an initiator solution was prepared by dissolving ammonium persulfate (APS) initiator in water. The amounts of these components are shown in Table 1, below.

A portion of the monomer emulsion (5 weight %) was fed to the reactor containing the reactive surfactant solution over 10 minutes. After another 10 minutes, the initiator solution was added to the reactor. The remainder of the monomer emulsion was then fed to the reactor over 2 hours and the reaction allowed to proceed for another 2 hours. The resulting latex containing resin particles formed from the polymerization of the monomers of the monomer emulsion was cooled to room temperature and neutralized to pH 8.0 with either an aqueous solution of dimethylethanolamine (DMEA) or a KOH solution.

TABLE 1

Compositions of the reactive surfactant solution, monomer emulsion, and initiator solution used to form latexes containing resin particles.

| | Material | Example 1 (g) | Example 2 (g) |
|---|---|---|---|
| Reactive Surfactant Solution | Hitenol AR-20 | 0.28 | — |
| | Hitenol AR-1025 | — | 1.1 |
| | Deionized water | 39 | 35 |
| Monomer Emulsion | Styrene | 20 | 24 |
| | n-Butyl acrylate | 13 | 11.6 |
| | bis-HEMA phosphate (bis[2-(methacryloyloxy)ethyl] phosphate (B2MP) and 2-hydroxyethyl methacrylate ester (PAM)) | 2 | — |
| | Methacrylic acid | 4.5 | 3 |
| | Poly(ethylene glycol) diacrylate (PEGDA 250) | — | 0.3 |
| | 1-Dodecanethiol (DDT) | 0.5 | 0.35 |
| | Sodium salt of styrene sulfonic acid (4-NaSS) | — | 0.5 |
| | Glycerol formal methacrylate (Glyfoma) | — | 1 |
| | Hitenol AR-20 | 0.18 | — |
| | Hitenol AR-1025 | — | 0.7 |
| | Deionized water | 16 | 16 |
| Initiator Solution | Ammonium persulfate (APS) | 0.34 | 0.45 |
| | Deionized water | 4.2 | 6 |
| | Total | 100 | 100 |

In replicate experiments, in order to carry out seed-free starved microemulsion polymerization instead of seed-feed emulsion polymerization (described above), the entire monomer emulsion was fed to reactor after charging the reactor with the initiator solution. The subsequent steps were similar to those described for the seed-feed emulsion polymerization above.

Example 3

The latex of Example 2 was used to form a black aqueous inkjet ink composition using the following steps. The formulation of the aqueous inkjet ink composition is shown in Table 2.

1. The black pigment dispersion was added to deionized water and mixed for about 15 minutes at a speed of about 650 RPM, using a Cowles blade impeller.
2. The latex of Example 2 was added slowly to the pigment dispersion and mixed for about 20 minutes (Mixture A).
3. In a separate beaker, the co-media and additives (stabilizer, surfactant, wetting agent/defoamer) were mixed to form a homogenous mixture (Mixture B).
4. Mixture B was slowly added into Mixture A. Once the addition was complete, the components were allowed to mix for another 20 minutes.
5. The wax was added and mixing continued for about another 15 minutes.
6. After mixing, the black aqueous inkjet ink composition was left at room temperature for about 60 minutes before checking pH, conductivity and surface tension.

TABLE 2

Composition of Aqueous Inkjet Ink Composition.

| Component | Material | Example 3 (g) |
|---|---|---|
| Liquid | Deionized Water | 19.305 |
| Pigment | Black pigment (16.1% solids) | 41.5 |
| Latex | Example 2 | 8.5 |
| Co-medium | Propylene glycol | 17.5 |
| Co-medium | 1,2-hexanediol | 3 |
| Co-medium | 1,5-pentanediol | 3 |
| Humectant | Glycerol | 4 |
| Stabilizer | Triethanolamine | 0.5 |
| Surfactant | Tego Tween 4000 | 0.045 |
| Wetting Agent/Defoamer | Surfynol AD01 | 1 |
| Wetting Agent/Defoamer | Dynol 360 | 0.65 |
| Wax | Michem Lube 190 (35% solids) | 1 |
| | Total | 100 |

Example 4

The latex of Example 1 was used to form an inkjet primer composition using the same steps as the black aqueous inkjet ink composition of Example 3 (except for step 1 involving the black pigment dispersion and step 5 involving the wax). The formulation of the inkjet primer composition is shown in Table 3.

TABLE 3

Composition of Inkjet Primer Composition.

| Component | Material | Example 4(g) |
|---|---|---|
| Liquid-- | Deionized water | 65 |
| Latex | Example 1 (40.9% solids) | 5.1 |
| Co-medium | Propylene glycol | 20 |
| Co-medium | 1,2-hexanediol | 4 |
| Humectant | Glycerol | 5 |
| Surfactant | Byk 348 | 0.4 |
| Wetting Agent/Defoamer | Surfynol AD01 | 0.4 |
| Wetting Agent/Defoamer | Byk 024 | 0.1 |
| | Total | 100 |

Print Testing

The black aqueous inkjet ink composition and the inkjet primer composition were jetted using a Dimatix DMP2800 printer on two substrates, including McCoy® gloss #100 and polyethylene terephthalate (PET). A first set of test key parameters used were as follows: Drop mass=4.5-4.8 ng (i.e., about 4.5 ng), Drop velocity=6-7 m/s, frequency=5 kHz, voltage=16-20V, printing temperature was 20° C. to 40° C. A second set of test key parameters used were as follows: Drop mass=8.5-9 ng (i.e., about 9 ng), Drop velocity=9-11 m/s, frequency=5 kHz, voltage=24-27 V, printing temperature was 20° C. to 40° ° C. The print parameter was a 600×600 dpi print. The measurement was done using a PIAS II instrument, which is a personal image analysis system with a digital loupe. The high-resolution optic module ~5 μm/pixel was used which has a field view of ~ 3.2 mm×2.4 mm to measure the dot size and diameter. Aqueous inkjet ink compositions/inkjet primer compositions which passed continuous jetting for >10-30 minutes were considered to exhibit good latency.

Gloss

Gloss measurements were obtained in order to determine gloss differential values. A BYK Gardner Micro Gloss meter(75°) was used for gloss measurements. Once the sample is printed on the paper substrate, the printed sample is kept for 24 hours. The gloss at 75° is measured with the digital micro gloss meter. The printed sample is then rubbed with a wipe thirty times and the gloss is measured again. The differential gloss before and after wiping thirty times is calculated. The lower the gloss differential the better the print robustness quality against rub.

Wet Rub Resistance (Water Fastness)

Samples were tested for wet rub resistance (20 double-rubs using wet Q-tip) (water fastness). Drops of each sample were printed on the desired substrate. The numbers in Table 4 indicate the number of double-rubs (an average of 3 measurements) that were obtained before any removal of the sample was observed.

Results for two samples are shown in Table 4, below. In the first sample, 9 ng drops of the inkjet primer composition of Example 4 were first printed onto McCoy Gloss paper. Next, 9 ng drops of the black aqueous inkjet ink composition of Example 3 were printed onto the previously printed inkjet primer composition. In the second comparative sample, 9 ng drops of the black aqueous inkjet ink composition of Example 3 were printed onto McCoy Gloss paper (no inkjet primer composition was used).

TABLE 4

Characterization using 9 ng drop of primer/ink on McCoy Gloss paper.

|  | Sample 1 Inkjet Primer Composition followed by Black Aqueous Inkjet Ink Composition | Sample 2 (Comparative) Black Aqueous Inkjet Ink Composition Only (No Inkjet Primer Composition) |
|---|---|---|
| Dot Diameter (μm) | 69.2 | 67.67 |
| Dot Circularity | 1.1 | 1.1 |
| Lines (μm) | 68 | 65 |
| Graininess | 0.9 | 0.87 |
| Mottle | 0.6 | 0.8 |
| OD | 1.893 | 1.843 |
| L* | 10.95 | 12.86 |
| a* | 2.11 | 1.12 |
| b* | 0.74 | −1.45 |
| Gloss 75° (before rub) | 101.1 | 100.57 |
| Gloss 75° (after rub) | 101.6 | 106.67 |
| ΔGloss | 0.5 | 6.1 |
| Water fastness (rub) | 12 | 9 |
| Raggedness | 0.004 | 0.007 |

As shown in Table 4, use of the inkjet primer composition improved line width, mottle, and raggedness. Notably, use of the inkjet primer composition decreased the gloss differential (Δ gloss) to less than 2 units. By using inkjet primer composition, the gloss differential improved by a factor of over 12. This is an unprecedented and significant commercial improvement in gloss performance.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An inkjet primer composition comprising water, a co-medium, and resin particles, wherein the resin particles comprise a polymerization product of reactants comprising one or more types of metal chelating monomers, wherein the one or more types of metal chelating monomers comprise one or more types of phosphoric acid monomers; one or more types of sulfonic acid monomers; or both one or more types of phosphoric acid monomers and one or more types of sulfonic acid monomers,
wherein the reactants further comprise one or more types of acidic monomers comprising (meth)acrylic acid monomers,
wherein a total amount of polymerized metal chelating monomers and polymerized (meth)acrylic acid monomers in the resin particles is at least about 8 weight % and a total amount of polymerized metal chelating monomers in the resin particles is at least about 4 weight %,
wherein a weight ratio of a total amount of polymerized metal chelating monomers in the resin particles to a total amount of polymerized (meth)acrylic acid monomers in the resin particles is less than about 0.5, and
further wherein the inkjet primer composition is free of a colorant.

2. The inkjet primer composition of claim 1, wherein the one or more types of metal chelating monomers comprise those characterized by a $pK_a$ of about 3 or less.

3. The inkjet primer composition of claim 1, wherein the reactants do not comprise 4-methylstyrene, cyclohexyl acrylate, isobornyl methacrylate, isobornyl acrylate, or combinations thereof.

4. The inkjet primer composition of claim 1, wherein the inkjet primer composition is free of a non-polymerized acid and the inkjet primer composition has a pH of from 7.5 to 9.

5. The inkjet primer composition of claim 1, consisting of the water, the co-medium, the resin particles, and optionally, one or more of a surfactant, a wetting agent, and a defoamer.

6. The inkjet primer composition of claim 1, wherein the one or more types of phosphoric acid monomers are present and comprise those having formula $P(O)(OR)_3$, wherein each R is independently selected from hydrogen and ethyl (meth)acrylate and at least one R is the ethyl (meth)acrylate.

7. The inkjet primer composition of claim 1, wherein the one or more types of sulfonic acid monomers are present and comprise those having formula $R'—S(O)_2(OH)$, wherein R' is selected from styrene, vinyl, an alkyl (meth)acrylate, and an alkyl (meth)acrylamide, wherein the alkyl group of the alkyl (meth)acrylate or the alkyl (meth)acrylamide has from 1 to 6 carbons.

8. The inkjet primer composition of claim 1,
wherein the one or more types of phosphoric acid monomers comprising those having formula $P(O)(OR)_3$, wherein each R is independently selected from hydrogen and ethyl (meth)acrylate and at least one R is the ethyl (meth)acrylate;
the reactants further comprise one or more types of hydrophobic monomers comprising styrene and an alkyl (meth)acrylate; and
the reactants further comprise a reactive surfactant.

9. The inkjet primer composition of claim 8, wherein the reactants do not comprise 4-methylstyrene, cyclohexyl acrylate, isobornyl methacrylate, isobornyl acrylate, or combinations thereof.

10. The inkjet primer composition of claim 1, wherein the polymerization product comprises poly[(styrene)-ran-(butyl acrylate)-ran-(phosphoric acid 2-hydroxyethyl methacrylate ester)-ran-(bis[2-(methacryloyloxy)ethyl] phosphate)-ran-(methacrylic acid)-ran-(anionic ether sulfate).

11. The inkjet primer composition of claim 10, wherein a total amount of polymerized phosphoric acid 2-hydroxyethyl methacrylate ester, polymerized bis[2-(methacryloyloxy)ethyl] phosphate, and polymerized methacrylic acid in the resin particles is at least about 8 weight %; a total amount of polymerized phosphoric acid 2-hydroxyethyl methacrylate ester and polymerized bis[2-(methacryloyloxy)ethyl] phosphate in the resin particles is at least about 4 weight %; and a weight ratio of a total amount of polymerized phosphoric acid 2-hydroxyethyl methacrylate ester and polymerized bis[2-(methacryloyloxy)ethyl] phosphate in the resin particles to a total amount of polymerized methacrylic acid in the resin particles is less than about 0.5.

12. The inkjet primer composition of claim 10, consisting of the water, the co-medium, the resin particles, and optionally, one or more of a surfactant, a wetting agent, and a defoamer.

13. An inkjet set for an inkjet printing system, the inkjet set comprising:
an inkjet primer composition comprising water, a co-medium, and resin particles, wherein the resin particles comprise a polymerization product of reactants comprising one or more types of metal chelating monomers; and
an aqueous inkjet ink composition for printing on an ink-receiving layer, the ink-receiving layer comprising the resin particles of the inkjet primer composition, the aqueous inkjet ink composition comprising water, a colorant, and additional resin particles,
wherein in the inkjet primer composition, the one or more types of metal chelating monomers comprise one or more types of phosphoric acid monomers; one or more types of sulfonic acid monomers; or both one or more types of phosphoric acid monomers and one or more types of sulfonic acid monomers,
wherein the reactants further comprise one or more types of acidic monomers comprising (meth)acrylic acid monomers,
wherein a total amount of polymerized metal chelating monomers and polymerized (meth)acrylic acid monomers in the resin particles is at least about 8 weight % and a total amount of polymerized metal chelating monomers in the resin particles is at least about 4 weight %,
wherein a weight ratio of a total amount of polymerized metal chelating monomers in the resin particles to a total amount of polymerized (meth)acrylic acid monomers in the resin particles is less than about 0.5, and
further wherein the inkjet primer composition is free of a colorant.

14. The inkjet set of claim 13, wherein the resin particles of the inkjet primer composition are negatively charged in the inkjet primer composition and the additional resin particles of the aqueous inkjet ink composition are negatively charged in the aqueous inkjet ink composition.

15. The inkjet set of claim 13, wherein the additional resin particles of the aqueous inkjet ink composition are the same as the resin particles of the inkjet primer composition.

16. The inkjet set of claim 13, wherein the aqueous inkjet ink composition printed onto the ink-receiving layer exhibits a gloss differential value of less than about 1 unit.

17. The inkjet set of claim 13, wherein the inkjet primer composition is free of a non-polymerized acid and the inkjet primer composition has a pH of from 7.5 to 9.

18. The inkjet set of claim 13, wherein the inkjet primer composition consists of the water, the co-medium, the resin particles, and optionally, one or more of a surfactant, a wetting agent, and a defoamer.

19. The inkjet set of claim 13, wherein the polymerization product of the resin particles comprises poly[(styrene)-ran-(butyl acrylate)-ran-(phosphoric acid 2-hydroxyethyl methacrylate ester)-ran-(bis[2-(methacryloyloxy)ethyl] phosphate)-ran-(methacrylic acid)-ran-(anionic ether sulfate).

20. The inkjet set of claim 19, wherein the inkjet primer composition consists of the water, the co-medium, the resin particles, and optionally, one or more of a surfactant, a wetting agent, and a defoamer.

* * * * *